(12) United States Patent
Payne et al.

(10) Patent No.: US 11,522,394 B2
(45) Date of Patent: Dec. 6, 2022

(54) HYBRID MODULE AND SHIPPING JIG

(71) Applicant: Schaeffler Technologies AG & Co. KG, Herzogenaurach (DE)

(72) Inventors: Matthew Payne, Glenmont, OH (US); Patrick Lindemann, Wooster, OH (US); John Ramsey, Mansfield, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 229 days.

(21) Appl. No.: 16/935,343

(22) Filed: Jul. 22, 2020

(65) Prior Publication Data
US 2022/0029479 A1    Jan. 27, 2022

(51) Int. Cl.
| | | |
|---|---|---|
| *H02K 7/10* | (2006.01) |
| *H02K 1/18* | (2006.01) |
| *B60K 6/26* | (2007.10) |
| *B60K 6/36* | (2007.10) |
| *B60K 6/38* | (2007.10) |
| *F16H 45/00* | (2006.01) |

(52) U.S. Cl.
CPC ............... *H02K 1/185* (2013.01); *B60K 6/26* (2013.01); *B60K 6/36* (2013.01); *B60K 6/38* (2013.01); *H02K 7/10* (2013.01); *B60Y 2200/92* (2013.01); *B60Y 2400/42* (2013.01); *F16H 45/00* (2013.01)

(58) Field of Classification Search
None
See application file for complete search history.

(56) References Cited

U.S. PATENT DOCUMENTS

| | | | |
|---|---|---|---|
| 10,399,427 B2 * | 9/2019 | Payne | B60K 6/405 |
| 10,428,922 B2 * | 10/2019 | Ramsey | F16H 41/04 |
| 10,486,520 B2 * | 11/2019 | Moasherziad | B60K 6/38 |
| 2012/0241233 A1 | 9/2012 | Suzuki et al. | |
| 2014/0190292 A1 | 7/2014 | Ishida et al. | |
| 2020/0040974 A1 | 2/2020 | Payne et al. | |

FOREIGN PATENT DOCUMENTS

| | | | | |
|---|---|---|---|---|
| DE | 102018129306 A1 * | 6/2019 | | F16H 41/04 |
| JP | 4647796 B2 | 3/2011 | | |
| JP | 5111232 B2 | 1/2013 | | |
| KR | 100645583 B1 | 11/2006 | | |

* cited by examiner

*Primary Examiner* — Dirk Wright

(57) ABSTRACT

A hybrid module includes a rotational axis and an electric motor. The electric motor has a stator assembly and a rotor assembly. The stator assembly includes a stator plate with a first radially extending tab with a first threaded hole for receiving a first fastener for fixing the stator assembly to a jig plate, a second radially extending tab with a first dowel hole for receiving a first dowel to locate the stator assembly in the jig plate, and a third radially extending tab with a second dowel hole for receiving a second dowel to locate the stator assembly in a transmission housing. The rotor assembly is disposed radially inside of the stator assembly and includes a torque converter with a pilot for locating the torque converter relative to the jig plate or relative to an engine crankshaft.

14 Claims, 3 Drawing Sheets

HYBRID MODULE AND SHIPPING JIG

TECHNICAL FIELD

The present disclosure relates generally to a hybrid module, and more specifically to a hybrid module and shipping jig.

BACKGROUND

Hybrid modules are known. One example is shown in commonly-assigned United States Patent Application Publication No. 2020/0040974 titled HYBRID MODULE CONFIGURATION to Payne et al, hereby incorporated by reference as if set forth fully herein.

SUMMARY

Example aspects broadly comprise a hybrid module with a rotational axis and an electric motor. The electric motor has a stator assembly and a rotor assembly. The stator assembly includes a stator plate with a first radially extending tab with a first threaded hole for receiving a first fastener for fixing the stator assembly to a jig plate, a second radially extending tab with a first dowel hole for receiving a first dowel to locate the stator assembly in the jig plate, and a third radially extending tab with a second dowel hole for receiving a second dowel to locate the stator assembly in a transmission housing. The rotor assembly is disposed radially inside of the stator assembly and includes a torque converter with a pilot for locating the torque converter relative to the jig plate or relative to an engine crankshaft.

In an example embodiment, at least two of the first radially extending tab, the second radially extending tab, or the third radially extending tab are integrated into a single radially extending tab. In some example embodiments, the stator plate has a fourth radially extending tab with a first through hole for receiving a second fastener for fixing the stator plate to the jig plate or to the transmission housing. In an example embodiment, at least two of the first radially extending tab, the second radially extending tab, the third radially extending tab or the fourth radially extending tab are integrated into a single radially extending tab. In an example embodiment, the second fastener is for fixing the stator plate to the jig plate, and the stator plate further includes a fifth radially extending tab with a second through hole for receiving a third fastener for fixing the stator plate to the transmission housing.

In some example embodiments, the torque converter has a drive plate for fixing the torque converter to the jig plate or to the engine crankshaft. In an example embodiment, the drive plate has a stud, and the torque converter is fixed to the jig plate or to the engine crankshaft by a nut threaded onto the stud.

In some example embodiments, the hybrid module includes the jig plate and the first fastener. The jig plate has a third through hole and the first fastener is installed in the third through hole and threaded into the first threaded hole to fix the stator plate to the jig plate. In an example embodiment, the jig plate includes a central bore aligned with the rotational axis and the pilot is installed in the central bore to locate the torque converter relative to the jig plate. In an example embodiment, the hybrid module has a lifting eye fixed to the jig plate by a fastener aligned with the rotational axis.

Other example aspects broadly comprise a hybrid module with a rotational axis, a jig plate, an electric motor, a first fastener and a first dowel. The jig plate has a first through hole, a first dowel hole, and a central bore aligned with the rotational axis. The electric motor has a stator assembly and a rotor assembly. The stator assembly includes a stator plate with a first radially extending tab with a first threaded hole and a second radially extending tab with a second dowel hole. The rotor assembly is disposed radially inside of the stator assembly and includes a torque converter with a pilot installed in the central bore locating the torque converter relative to the jig plate. The first fastener extends through the first through hole, threads into the first threaded hole, and fixes the stator assembly to the jig plate. The first dowel is installed in the first dowel hole and in the second dowel hole and locates the stator plate relative to the jig plate.

In an example embodiment, the stator plate has a third radially extending tab with a third dowel hole for receiving a second dowel to locate the stator assembly in a transmission housing. In some example embodiments, the hybrid module has a second fastener. The jig plate has a second threaded hole and the stator plate has a third radially extending tab with a second through hole. The second fastener extends through the second through hole, threads into the second threaded hole, and fixes the stator assembly to the jig plate. In an example embodiment, the stator plate has a fourth radially extending tab with a third through hole for receiving a third fastener for fixing the stator plate to a transmission housing.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
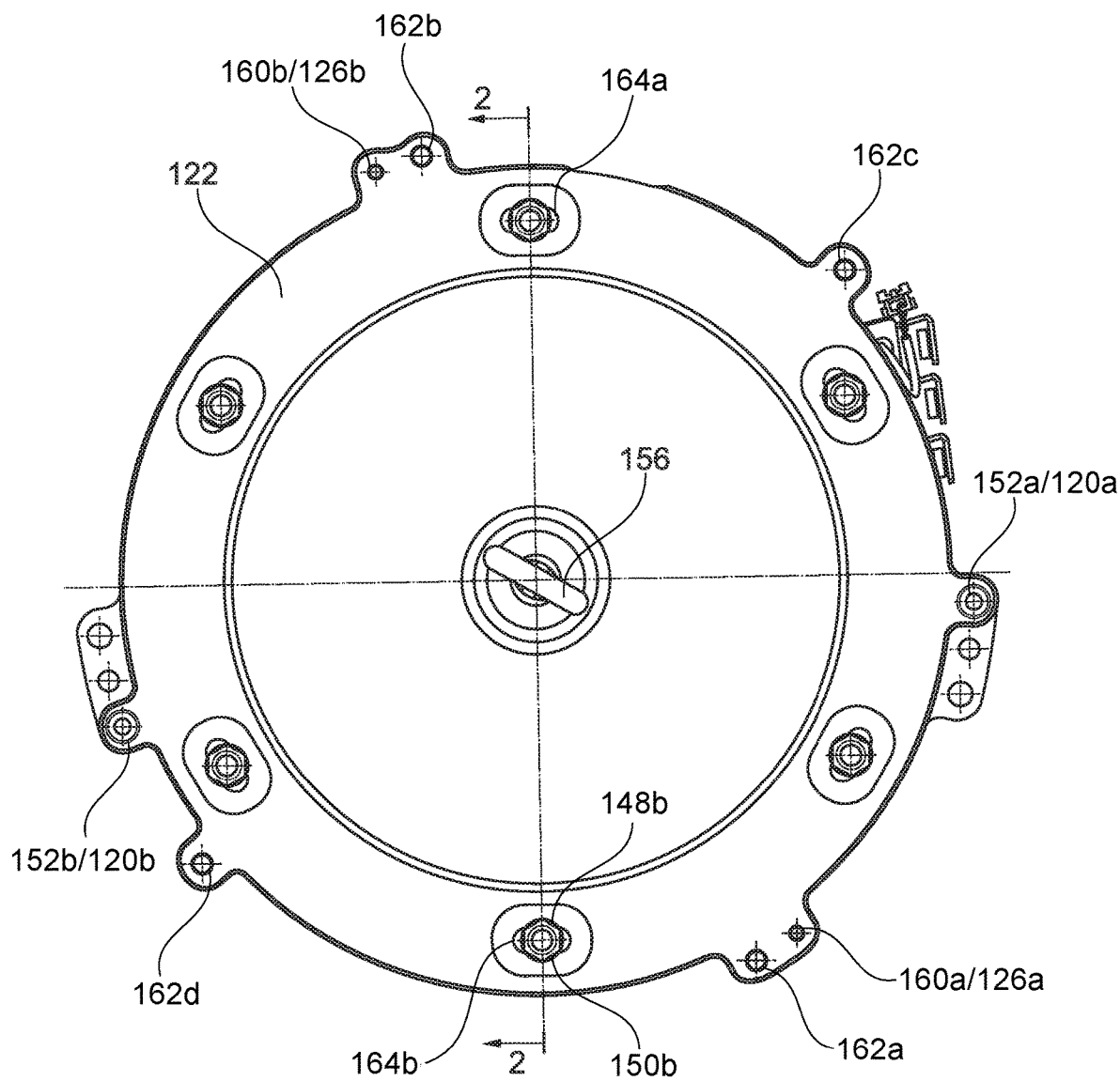
FIG. 1 illustrates a front view of a hybrid module according to an example embodiment.
Figure 2:
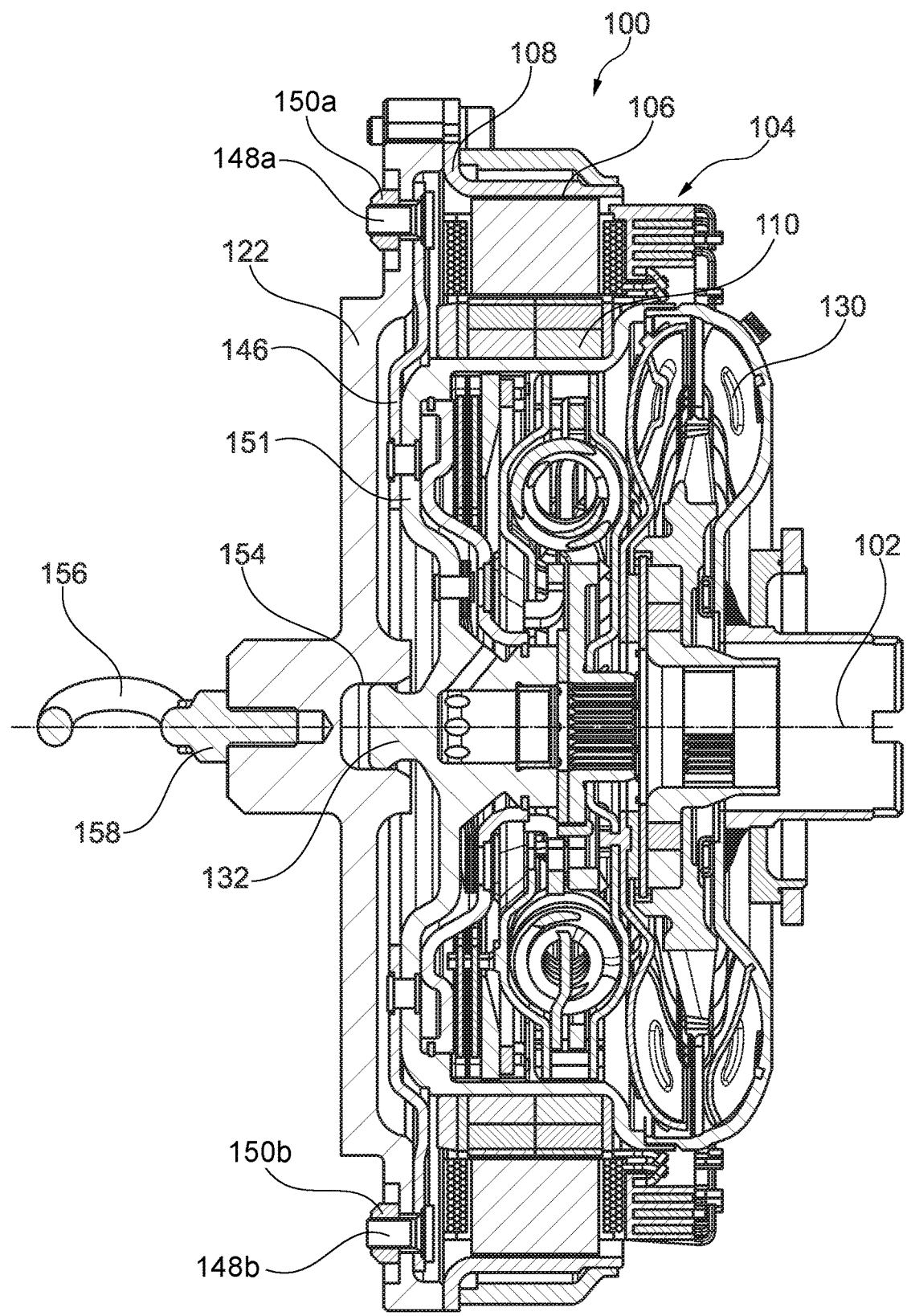
FIG. 2 illustrates a cross-sectional view of the hybrid module of FIG. 1 taken generally along line 2-2 in FIG. 1.
Figure 3:
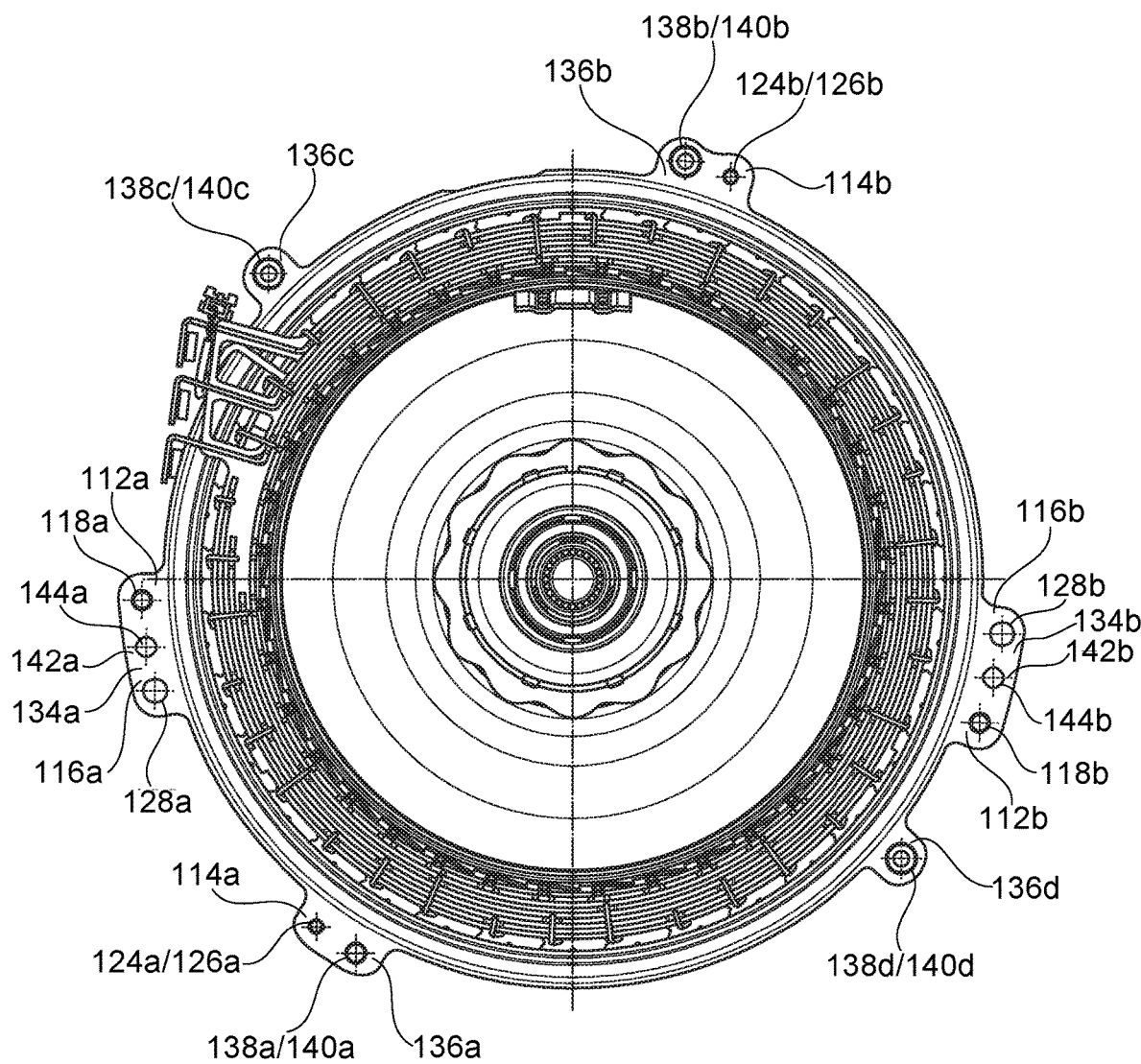
FIG. 3 illustrates a back view of the hybrid module of FIG. 1.

The following description is made with reference to FIGS. 1-3. FIG. 1 illustrates a front view of hybrid module 100 according to an example embodiment. FIG. 2 illustrates a cross-sectional view of hybrid module 100 of FIG. 1 taken generally along line 2-2 in FIG. 1. FIG. 3 illustrates a back view of hybrid module 100 of FIG. 1.

Hybrid module 100 includes rotational axis 102 and electric motor 104. The electric motor includes stator assembly 106 with stator plate 108, and rotor assembly 110. The stator plate includes radially extending tabs 112a, 112b, 114a, 114b, 116a and 116b. Tab 112a includes threaded hole 118a for receiving fastener 120a for fixing the stator assembly to jig plate 122 as described in more detail below. Tab 112b includes threaded hole 118b for receiving fastener 120b for fixing the stator assembly to jig plate 122 as described in more detail below. By threaded holes, we mean holes with threads for installing a removable fastener such as a bolt or a screw, for example. Threaded holes may include threads cut into a steel plate or a cast iron or aluminum housing, for example, or may include a separate nut, insert, or other component with threads fixed to the component, for example. Threaded holes may also include holes with threads which are cut when a self-threading fastener is installed, for example.

Tab 114a includes dowel hole 124a for receiving dowel 126a to locate the stator assembly in the jig plate. Tab 114b includes dowel hole 124b for receiving dowel 126b to locate the stator assembly in the jig plate. Tab 116a includes dowel hole 128a for receiving a dowel (not shown) to locate the stator assembly in a transmission housing (not shown). Tab 116b includes dowel hole 128b for receiving a dowel (not shown) to locate the stator assembly in a transmission housing (not shown). Rotor assembly 110 is disposed radially inside of the stator assembly and includes torque converter 130. The torque converter includes pilot 132 for locating the torque converter relative to jig plate 122 or relative to an engine crankshaft (not shown).

In the embodiment shown, tabs 112a and 116a are integrated into single radially extending tab 134a, and tabs 112b and 116b are integrated into a single radially extending tab 134b, although other combinations are possible. In other words, two of tabs 112a, 114a, and 116a, or two of tabs 112b, 114b and 116b, may be integrated into a single radially extending tab. Stator plate 108 also includes radially extending tab 136a with through hole 138a for receiving fastener 140a, radially extending tab 136b with through hole 138b for receiving fastener 140b, radially extending tab 136c with through hole 138c for receiving fastener 140c and radially extending tab 136d with through hole 138d for receiving fastener 140d, for fixing the stator plate to jig plate 122 or to the transmission housing (not shown) as described in more detail below. As described above, two of tabs 112a, 114a, 116a, and 136a, or tabs 112b, 114b, 116b, and 136b, may be integrated into a single radially extending tab. In the embodiment shown, fasteners 140a, 140b, 140c and 140d are for fixing the stator plate to the jig plate, and the stator plate includes radially extending tabs 142a and 142b with through holes 144a and 144b, respectively, for receiving a fastener (not shown) for fixing the stator plate to the transmission housing.

Torque converter 130 includes drive plate 146 for fixing the torque converter to the jig plate or to the engine crankshaft. Drive plate 146 includes studs 148a and 148b and the torque converter may be fixed to the jig plate or to the engine crankshaft by nuts 150a and 150b threaded onto the studs. In the embodiment shown, the torque converter is fixed to the jig plate but other embodiments (not shown) may include the torque converter fixed to the engine crankshaft by nuts 150a and 150b. In the embodiment shown, torque converter 130 includes a drive plate with studs but the drive plate may include nuts fixed to the drive plate or to the crankshaft and the hybrid module may use bolts to attach the torque converter. The torque converter may also include threaded lugs fixed to torque converter cover 151 with bolts to attach the torque converter. The crankshaft may include a flexplate for attachment to the torque converter as is commonly known in the art.

Hybrid module 100 may include jig plate 122 during transportation to an assembly plant, for example. During assembly, however, the jig plate is removed when the hybrid module is installed in a transmission and/or fixed to a vehicle engine. Jig plate 122 includes through hole 152a and fastener 120a is installed in through hole 152a and threaded into threaded hole 118a to fix the stator plate to the jig plate. Jig plate 122 includes through hole 152b and fastener 120b is installed in through hole 152b and threaded into threaded hole 118b to fix the stator plate to the jig plate. Jig plate 122 also includes central bore 154 aligned with the rotational axis. Pilot 132 is installed in the central bore to locate the torque converter relative to the jig plate. Lifting eye 156 is fixed to the jig plate by fastener aligned 158 with the rotational axis.

Hybrid module 100 includes rotational axis 102, jig plate 122 and electric motor 104. The jig plate includes through holes 152a and 152b, dowel holes 160a and 160b, and central bore 154 aligned with the rotational axis. The electric motor includes stator assembly 106 and rotor assembly 110. The stator assembly includes stator plate 108 with radially extending tabs 112a and 112b including threaded holes 118a and 118b, and radially extending tabs 114a and 114b with dowel holes 124a and 124b. Fastener 120a extends through hole 152a and is threaded into threaded hole 118a to fix the stator assembly to the jig plate. Fastener 120b extends through hole 152b and is threaded into threaded hole 118b to fix the stator assembly to the jig plate. That is, in order to position the stator assembly during shipping, for example, the jig plate is installed onto the stator assembly by fasteners 120a and 120b. Fasteners 120a and 120b can be easily removed from the hybrid module after assembly with a transmission so that the jig plate can be removed before assembly with an engine.

Hybrid module 100 includes dowel 126a installed in dowel holes 124a and 160a to locate the stator plate relative to the jig plate. Hybrid module 100 includes dowel 126b installed in dowel holes 124b and 160b to locate the stator plate relative to the jig plate. The dowel may be pressed or fixed into the jig plate dowel hole and removed with the jig plate or pressed or fixed into the stator plate dowel hole and used for positioning the stator assembly in a dowel hole of an engine housing, for example.

Rotor assembly 110 is disposed radially inside of the stator assembly and includes torque converter 130 with pilot 132. Pilot 132 is installed in central bore 154 of jig plate 122 for locating the torque converter relative to the jig plate. Installation of pilot 132 into bore 154 provides positioning of the rotor assembly in the jig and, because that stator assembly is positioned in the jig by dowels and fasteners as described above, provides positioning between the rotor assembly and the stator assembly to prevent the two components from damaging one another during shipping of the hybrid module, for example.

Stator plate 108 includes radially extending tab 116a with dowel hole 128a for receiving a second dowel (not shown) to locate the stator assembly in a transmission housing (not shown). Stator plate 108 includes radially extending tab 116b with dowel hole 128b for receiving a second dowel (not shown) to locate the stator assembly in a transmission housing (not shown). As described above, the dowel may be pressed or fixed in the stator plate dowel hole or pressed or fixed in the transmission housing dowel hole.

Jig plate 122 includes threaded holes 162a, 162b, 162c and 162d, and stator plate 108 includes radially extending tabs 136a, 136b, 136c, and 136d with through holes 138a, 138b, 138c, and 138d, respectively. Fasteners 140a, 140b, 140c and 140d extend through holes 138a, 138b, 138c and 138d, respectively, and are threaded into the threaded holes 162a, 162b, 162c and 162d to fix the stator assembly to the jig plate. It should be noted, however, that fasteners 140a, 140b, 140c and 140d must be removed before the hybrid module can be assembled with a transmission but fasteners 120a and 120b can remain to keep the two components fixed together. As described above, fasteners 120a and 120b, and jig 122, are removed when the transmission (including the hybrid module) is assembled with a combustion engine. Stator plate 108 includes radially extending tabs 142a and 142b with through holes 144a and 144b, respectively for receiving a fastener (not shown) for fixing the stator plate to a transmission housing. That is, once dowels are positioned between the transmission and the stator plate, fasteners are installed in holes 144a and 144b to fix the hybrid module to the transmission housing.

Arrangements of the various fasteners and dowels will now be described as they relate to various stages of the assembly process. During assembly of the hybrid module, the jig plate is positioned relative to the torque converter by pilot 132 installed in bore 154 and fixed to the torque converter by studs 148a and 148b installed in through holes 164a and 164b, respectively, and secured with nuts 150a and 150b. The jig plate is positioned relative to the stator plate by dowels 126a and 126b installed in dowel holes 124a and 160a, and 124b and 160b, respectively, and fixed to the stator plate by fasteners 120a and 120b installed through holes 152a and 152b, respectively, and threaded into threaded holes 118a and 118b. Additional fasteners 140a, 140b, 140c and 140d may be installed in through holes 138a, 138b, 138c and 138d, respectively, and threaded into threaded holes 162a, 162b, 162c and 162d to further secure the two components for transport.

During assembly of the hybrid module with a transmission, fasteners 140a, 140b, 140c and 140d are removed and dowels (not shown) align dowel holes 128a and 128b with corresponding dowel holes in a transmission housing (not shown). Fasteners (not shown) installed in through holes 144a and 144b secure the stator plate to the transmission housing. Jig 122 remains in place to maintain position of rotor assembly 110 relative to stator assembly 106.

Once the transmission arrives at a vehicle assembly plant (or another facility where the transmission is assembled with a combustion engine), fasteners 120a and 120b and nuts 150a and 150b are removed and the jig is removed from the transmission assembly. Torque converter pilot 132 is installed in an engine crankshaft and nuts 150a and 150b (or new nuts) are installed on studs 148a and 148b to fix the torque converter to the engine crankshaft. Dowels 126a and 126b may remain with the stator plate and be used to position the transmission in relative to the engine housing or additional dowels may be installed in the engine housing and dowel holes 124a and 124b or be installed in the transmission and extend into dowel holes (not shown) in the engine housing, for example. One aligned, the transmission can be bolted to the engine housing with fasteners (not shown).

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Hybrid module
102 Rotational axis
104 Electric motor
106 Stator assembly
108 Stator plate
110 Rotor assembly
112a Radially extending tab (first)
112b Radially extending tab
114a Radially extending tab (second)
114b Radially extending tab
116a Radially extending tab (third)
116b Radially extending tab
118a Threaded hole (first, tab 112a)
118b Threaded hole (tab 112b)
1120a Fastener (first, jig plate to stator assembly)
120b Fastener (jig plate to stator assembly)
122 Jig plate
124a Dowel hole (first, tab 114a)
124b Dowel hole (tab 114b)
126a Dowel (first, stator assy to jig plate)
126b Dowel (stator assy to jig plate)
128a Dowel hole (second, tab 116a)
128b Dowel hole (tab 116b)
130 Torque converter
132 Pilot
134a Single radially extending tab
134b Single radially extending tab
136a Radially extending tab (fourth)
136b Radially extending tab
136c Radially extending tab
136d Radially extending tab
138a Through hole (first, tab 136a)
138b Through hole (tab 136b)

138c Through hole (tab 136c)
138d Through hole (tab 136d)
140a Fastener (second, stator assembly to jig plate)
140b Fastener (stator assembly to jig plate)
140c Fastener (stator assembly to jig plate)
140d Fastener (stator assembly to jig plate)
142a Radially extending tab (fifth)
142b Radially extending tab
144a Through hole (second, tab 142a)
144b Through hole (tab 142b)
146 Drive plate
148a Stud
148b Stud
150a Nut
150b Nut
151 Torque converter cover
152a Through hole (first, jig plate)
152b Through hole (jig plate)
154 Central bore (jig plate)
156 Lifting eye
158 Fastener (lifting eye to jig plate)
160a Dowel hole (first, jig plate)
160b Dowel hole (jig plate)
162a Threaded hole (first, jig plate)
162b Threaded hole (jig plate)
164a Through hole (jig plate)
164b Through hole (jig plate)

What is claimed is:

1. A hybrid module comprising:
a rotational axis; and
an electric motor comprising:
    a stator assembly comprising a stator plate, the stator plate comprising:
        a first radially extending tab with a first threaded hole for receiving a first fastener for fixing the stator assembly to a jig plate;
        a second radially extending tab with a first dowel hole for receiving a first dowel to locate the stator assembly in the jig plate; and
        a third radially extending tab with a second dowel hole for receiving a second dowel to locate the stator assembly in a transmission housing; and
    a rotor assembly disposed radially inside of the stator assembly and comprising a torque converter with a pilot for locating the torque converter relative to the jig plate or relative to an engine crankshaft.

2. The hybrid module of claim 1 wherein two of the first radially extending tab, the second radially extending tab, or the third radially extending tab are integrated into a single radially extending tab.

3. The hybrid module of claim 1 wherein the stator plate further comprises a fourth radially extending tab with a first through hole for receiving a second fastener for fixing the stator plate to the jig plate or to the transmission housing.

4. The hybrid module of claim 3 wherein of the first radially extending tab, the second radially extending tab, the third radially extending tab or the fourth radially extending tab are integrated into a single radially extending tab.

5. The hybrid module of claim 3 wherein:
the second fastener is for fixing the stator plate to the jig plate; and
the stator plate further comprises a fifth radially extending tab with a second through hole for receiving a third fastener for fixing the stator plate to the transmission housing.

6. The hybrid module of claim 1 wherein the torque converter comprises a drive plate for fixing the torque converter to the jig plate or to the engine crankshaft.

7. The hybrid module of claim 6 wherein:
the drive plate comprises a stud; and
the torque converter is fixed to the jig plate or to the engine crankshaft by a nut threaded onto the stud.

8. The hybrid module of claim 1 further comprising:
the jig plate; and
the first fastener, wherein the jig plate comprises a first jig plate through hole and the first fastener is installed in the first jig plate through hole and threaded into the first threaded hole to fix the stator plate to the jig plate.

9. The hybrid module of claim 8 wherein the jig plate comprises a central bore aligned with the rotational axis and the pilot is installed in the central bore to locate the torque converter relative to the jig plate.

10. The hybrid module of claim 8 further comprising a lifting eye fixed to the jig plate by a lifting eye fastener aligned with the rotational axis.

11. A hybrid module comprising:
a rotational axis;
a jig plate comprising:
    a first jig plate through hole;
    a first jig plate dowel hole; and
    a central bore aligned with the rotational axis; and
an electric motor comprising:
    a stator assembly comprising a stator plate, the stator plate comprising:
        a first radially extending tab with a first threaded hole; and
        a second radially extending tab with a first dowel hole; and
    a rotor assembly disposed radially inside of the stator assembly and comprising a torque converter with a pilot installed in the central bore locating the torque converter relative to the jig plate;
a first fastener:
    extending through the first jig plate through hole;
    threaded into the first threaded hole; and
    fixing the stator assembly to the jig plate; and
a first dowel installed in the first dowel hole and in the first jig plate dowel hole locating the stator plate relative to the jig plate.

12. The hybrid module of claim 11 wherein the stator plate further comprises a third radially extending tab with a second dowel hole for receiving a second dowel to locate the stator assembly in a transmission housing.

13. The hybrid module of claim 11 further comprising a second fastener, wherein:
the jig plate further comprises a first jig plate threaded hole;
the stator plate further comprises a fourth radially extending tab with a first through hole; and
the second fastener:
    extends through the first through hole;
    is threaded into the first jig plate threaded hole; and
    fixes the stator assembly to the jig plate.

14. The hybrid module of claim 13 wherein the stator plate comprises a fifth radially extending tab with a second through hole for receiving a third fastener for fixing the stator plate to a transmission housing.

* * * * *